US008764958B2

(12) United States Patent
Wang

(10) Patent No.: US 8,764,958 B2
(45) Date of Patent: Jul. 1, 2014

(54) HIGH-VOLTAGE MICROFLUIDIC DROPLETS ACTUATION BY LOW-VOLTAGE FABRICATION TECHNOLOGIES

(76) Inventor: Gary Chorng-Jyh Wang, Cupertino, CA (US)

( * ) Notice: Subject to any disclaimer, the term of this patent is extended or adjusted under 35 U.S.C. 154(b) by 19 days.

(21) Appl. No.: 13/594,718

(22) Filed: Aug. 24, 2012

(65) Prior Publication Data

US 2014/0054174 A1 Feb. 27, 2014

(51) Int. Cl.
*G01N 27/453* (2006.01)

(52) U.S. Cl.
USPC .......................................... 204/600; 204/643

(58) Field of Classification Search
USPC ................................. 204/450, 600, 643, 547
See application file for complete search history.

(56) References Cited

U.S. PATENT DOCUMENTS 8,252,159 B2 * 8/2012 Roux et al. .................... 204/450
2011/0247934 A1 * 10/2011 Wang et al. ................... 204/450

OTHER PUBLICATIONS

Peykoy et al., "Electrowetting: a model for contact-angle saturation," Colloid Polym. Sci. 278:789-793 (2000).*

* cited by examiner

*Primary Examiner* — Alex Noguerola
(74) *Attorney, Agent, or Firm* — Haverstock & Owens LLP

(57) ABSTRACT

A bi-state-switch low-voltage fabrication technique is able to be used to construct microfluidic systems leveraging well-established low-voltage semiconductor fabrication technologies to achieve high-voltage droplet actuation applications with lower costs, smaller device sizes, and also less time. Also, the electrode cells are able to be made using the well-established low-voltage CMOS fabrication technologies, which can be used to make large-scale integrated microelectronics and microfluidics.

21 Claims, 3 Drawing Sheets

500

HIGH-VOLTAGE MICROFLUIDIC DROPLETS ACTUATION BY LOW-VOLTAGE FABRICATION TECHNOLOGIES

FIELD OF THE INVENTION

The present invention relates to the actuation of microfluidic droplets, which is considered as high-voltage applications from semiconductor fabrication point of view by using standard low-voltage semiconductor fabrication technologies.

The present invention is able to be used to advance the construction of future digital microfluidic systems with large-scale microelectronic and microfluidic integration because the present invention enables the standard semiconductor fabrication technologies to implement digital microfluidic systems.

BACKGROUND OF THE INVENTION

In droplet-based microfluidic devices, a liquid is sandwiched between two parallel plates and transported in the form of droplets. Droplet-based microfluidic systems offer many advantages: low power consumption and require no mechanical components such as pumps or valves. In recent years, droplet-based microfluidic systems have been broadly utilized in applications such as the mixing of analytes and reagents, the analysis of biomolecules, and particle manipulation. In digital microfluidic systems, electro-wetting-on-dielectric (EWOD) and liquid dielectrophoresis (LDEP) are the two main mechanisms that are used to dispense and manipulate droplets. EWOD and LDEP both exploit electromechanical forces to control the droplet. EWOD microsystems are usually utilized to create, transport, cut, and merge liquid droplets. In these systems, the droplet is sandwiched between two parallel plates and actuated under the wettability differences between the actuated and nonactuated electrodes. In LDEP microsystems, the liquids become polarizable and flow toward regions of stronger electric field intensity when a voltage is applied. The differences between LDEP and EWOD actuation mechanisms are the actuation voltage and the frequency. In EWOD actuation, a DC or low-frequency AC voltage, typically between 50 Vrms and 100 Vrms, is applied, whereas LDEP needs a higher actuation voltage (100-300 Vrms) and a higher frequency (50-200 kHz).

To manufacture the microfluidic system, conventionally it requires constructing high voltage electrodes to perform droplet actuation. Typically the top plate then is used as electrical voltage reference (or ground).

SUMMARY

A number of methods of manipulating microfluidic droplets have been proposed in the literature. These techniques can be classified as chemical, thermal, acoustical, and electrical methods. Liquid dielectrophoresis (LDEP) and electrowetting-on-dielectric (EWOD) are the two most common electrical methods. Both of these techniques take advantage of electrohydrodynamic forces, and they provide high droplet speeds with relatively simple geometries.

Liquid DEP actuation is defined as the attraction of polarizable liquid masses into the regions of higher electric-field intensity. DEP-based microfluidics relies on electrodes patterned on a substrate, coated with a thin dielectric layer, and energized with an AC voltage. Rapid dispensing of a large number of pico-liter-volume droplets and a voltage-controlled array mixer has been demonstrated using the DEP. However, excessive Joule heating is a problem for DEP actuation, even though it can be reduced by using materials of higher thermal conductivity or by reducing structure size.

EWOD uses electric fields to directly control the interfacial energy between a solid and liquid phase. In contrast to DEP actuation, Joule heating is virtually eliminated in EWOD because the dielectric layer covering the electrodes blocks a DC electric current. Although there are many ways for manipulating microfluidic droplets, "digital microfluidics" generally refers to the manipulation of nano-liter droplets using EWOD. EWOD refers to the modulation of the interfacial tension between a conductive fluid and a solid electrode coated with a dielectric layer by applying an electric field between them. A EWOD-based digital microfluidic device is able to comprise two parallel glass plates. The bottom plate contains a patterned array of individually controllable electrodes, and the top plate is coated with a continuous ground electrode. Electrodes are able to be formed by a material such as indium tin oxide (ITO) that has the combined features of electrical conductivity and optical transparency in a thin layer. A dielectric insulator, e.g., parylene C, coated with a hydrophobic film such as Teflon AF, is added to the plates to decrease the wettability of the surface and to add capacitance between the droplet and the control electrode. The droplet containing biochemical samples and the filler medium, such as the silicone oil, are sandwiched between the plates. The droplets travel inside the filler medium. In order to move a droplet, a control voltage is applied to an electrode adjacent to the droplet and at the same time the electrode just under the droplet is deactivated.

In some embodiments, a microfluidic biochip is able to integrate microelectronic components. High-voltage CMOS fabrication technologies has several issues. The first issue is the size of the high-voltage cells. Moreover, power consumption, stability/cost of the fabrication technologies and compatibility with existing CMOS designs are all difficult issues. It is therefore that electrode cells in some embodiments of the present invention are amenable to the well-established low-voltage CMOS fabrication technologies for integration of microelectronics and microfluidics.

The present invention uses the well-established low-voltage fabrication technologies to construct a digital microfluidic system. Once an electrical potential is applied between the top and bottom driving electrodes, the EWOD effect causes an accumulation of charges in the droplet/insulator interface, resulting in an interfacial tension gradient across the gap between the adjacent electrodes, which consequently causes transportation of the droplet. Although the polarity change of the electrical potential can cause some degree of changes of the accumulation of charge in the droplet/insulator because of the differences of material dielectric and physical parameters, the overall droplet actuations is still able to be reliably performed.

In some embodiments, a high-voltage is applied to the top plate and electrodes on the bottom plates are implemented by a bi-state-switch technology which does not require any high-voltage components. Thus, well-established low-voltage fabrication technologies can be utilized to construct the digital microfluidic systems.

In other embodiments, low-voltage fabrication technologies include but not limited to CMOS, TFT (Thin-film-transistor), and other semiconductor fabrication technologies are able to be used to construct the devices described above.

In some other embodiments, the bi-state-switch electrode is activated when it is grounded. The high-impedance mode comprises that the electrode is deactivated. The bi-state-switch electrodes are able to be manufactured with the typical semiconductor fabrication process to reduce costs and space.

In some embodiments, protection circuitry are built (1) to increase the breakdown voltage, (2) to reduce the leakage current of a positive voltage, (3) to prevent the short to ground of a negative voltage through p-n junction and (4) to increase the high-impedance of bi-state-switch electrodes.

In one aspect, a device for high-voltage droplet actuation comprising a top plate comprising a continuous electrode disposed on a bottom surface of a first substrate covered by a first hydrophobic layer and a bottom plate comprising an array of multiple electrodes disposed on a top surface of a second substrate covered by a first dielectric layer, wherein each of the multiple electrodes is spaced by a separator, wherein a second hydrophobic layer is disposed on the first dielectric layer forming a hydrophobic surface. In some embodiments, the continuous electrode couples with a driving voltage source. In other embodiments, the driving voltage source is configured to provide a driving voltage configured to actuate a droplet.

In some other embodiments, the top plate further comprises a second dielectric layer. In some embodiments, the top plate and bottom plate are insulated by the first and the second dielectric layer and the first and the second hydrophobic layers when a droplet is sandwiched between the top and bottom plates, such that damage to the bottom plate by a high-voltage driving voltage on the top plate is able to be avoided.

In some other embodiments, the bottom plate is implemented by a bi-state-switch technology that an actuating mode is to short the electrode to GND. In some embodiments, the device further comprises a high-impedance mode, wherein the continuous electrode, the array of multiple electrodes, or both are deactivated at the high-impedance mode.

In some other embodiments, the bi-state-switch technology is able to be expanded into a tri-state-switch technology that the third state is a logic '1' state. The logic '1' state has the voltage of power supply node VDD (3.5 V-0.4 V). The tri-state-switch technology is able to be used in other applications that the high-impedance and '0' states are used for droplet actuation and the '1' state is used for detection or self-test. In some other embodiments, the logic '1' state is able to be used for droplet detection that the electrode on the bottom plate is charged up to VDD and then discharged. The discharging speed is able to depend on the RC time constant of the capacitance of the electrode. An electrode with a droplet on top of it has bigger capacitance than the one without droplet on top. By measuring the discharging (or charging) speed, the droplet can be detected.

In some embodiments, the continuous electrode, the array of multiple electrodes, or both do not contain high-voltage components and are able to be implemented by a semiconductor fabrication process. In other embodiments, the semiconductor fabrication process comprises a process of making CMOS, TFT, TTL, GaAs, or a combination thereof. In some other embodiments, the array of multiple electrodes comprises a first electrode adjacent to a second electrode. In some embodiments, the device further comprises a droplet disposed on top of the first electrode and overlapped with a portion of the second electrode.

In other embodiments, the device further comprises a system management unit configured to generate one or more instructions manipulating one or more droplets among the multiple electrodes by sequentially grounding, activating or de-activating one or more selected electrodes such that a droplet is actuated to move along a selected route. In some other embodiments, the device comprises a EWOD device. In some embodiments, the device comprises a DEP device configured to generate a driving voltage in the range from 50 kHz to 200 kHz of AC with 100 to 300 Vrms. In other embodiments, the device comprises a CMOS device manufactured by a typical CMOS fabrication process. In some other embodiments, the device further comprises and/or utilizes a passivation layer comprising $Si_3N_4/SiO_2$ or other oxide materials to be the dielectric layer.

In some embodiments, the device comprises a CMOS device wherein standard low-voltage (3.5 V-0.4V) CMOS components are used to implement a bi-state-switch. In other embodiments, the device comprises a CMOS device comprising a protection circuitry configured to increase a breakdown voltage, reduce a leakage current of a positive voltage, prevent a short to ground of a negative voltage through p-n junction, increase a high-impedance of bi-state-switch electrodes in an open mode, or a combination thereof. In some other embodiments, the device comprises a TFT device comprises a bi-state-switch using transistors made of deposited thin films. In other embodiments, the device further comprises a DC power source applied to a DC/DC converter which comprises a discharge function that shorts one or more of the multiple electrodes to GND in order to actuate a droplet through a gate bus-line to turn a TFT on.

DETAILED DESCRIPTION

Figure 1:
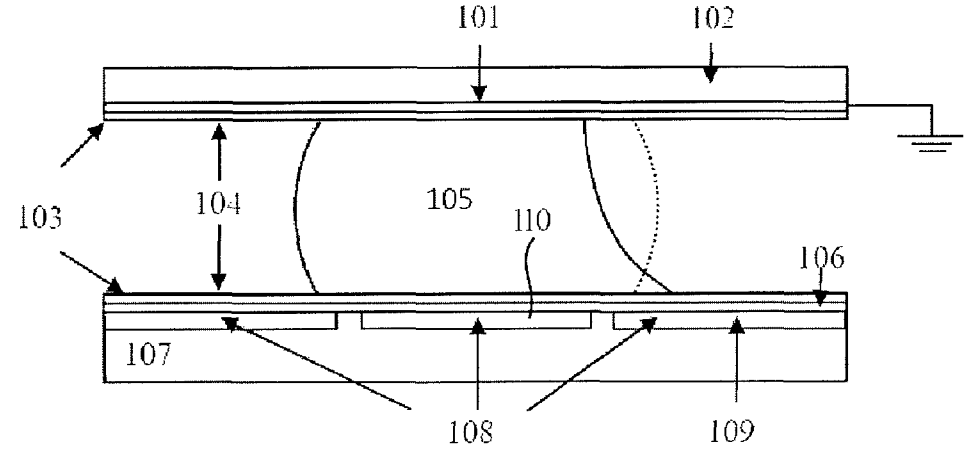
FIG. 1 is a diagram illustrating a microfluidic system comprising high-voltage driving electrodes.

A conventional electrowetting microactuator mechanism is illustrated in FIG. 1. The digital microfluidic device comprises two parallel plates 102 and 107, respectively, with a distance gap 104. The bottom plate 107 contains an array of individually controllable electrodes 108, and the top plate 102 is coated with a continuous ground electrode 101. Electrodes are able to be formed by a material, such as indium tin oxide (ITO) that has the combined features of electrical conductivity and optical transparency in thin layer. A dielectric insulator 106, e.g., parylene C, coated with a hydrophobic film 103 such as Teflon AF, is added to the plates to decrease the wettability of the surface and to add capacitance between the droplet and the control electrode. The droplet 105 containing biochemical samples and the filler medium, such as the silicone oil or air, are sandwiched between the plates to facilitate the transportation of the droplet 105 inside the filler medium. In order to move a droplet 105, a control voltage, which is typically in the range of 50-150 Vrms and is too high of a voltage for most semiconductor fabrication technologies, is applied to an electrode 109 adjacent to the deactivated electrode 110 that is directly under a droplet 105.

Figure 2:
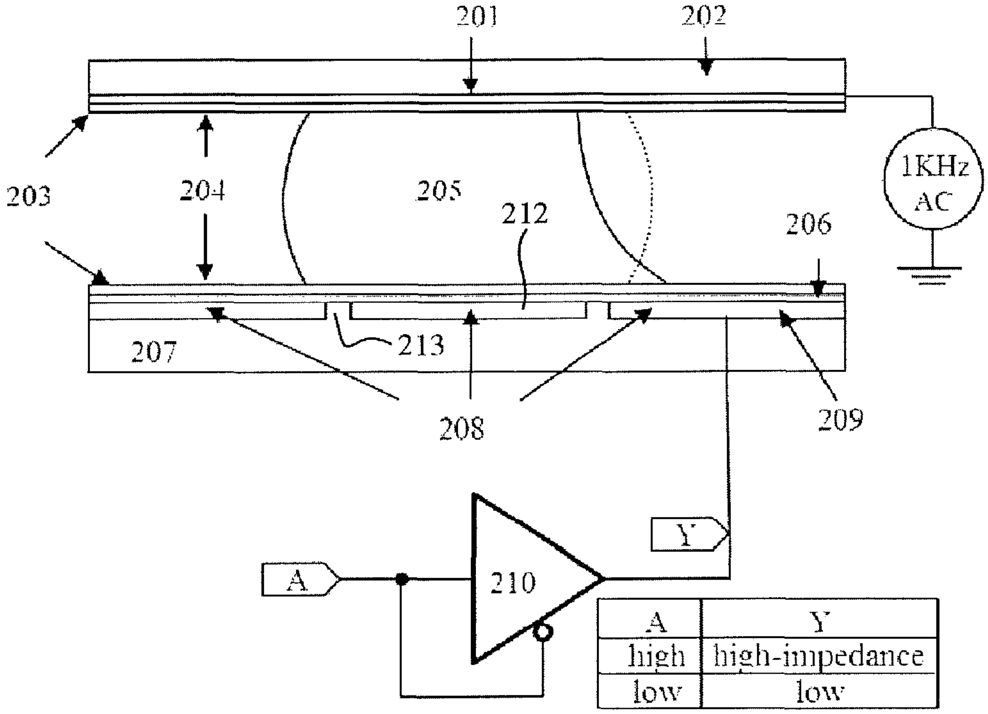
FIG. 2 is a diagram illustrating a microfluidic system comprising bi-state-switch low-voltage driving electrodes.

FIG. 2 illustrate a digital microfluidic device in accordance with some embodiments. The digital microfluidic device with a bi-state-switch low-voltage method comprises two parallel plates 202 and 207, respectively, with a distance gap 204. The bottom plate 207 contains an array of individually controllable electrodes 208, and the top plate 202 is coated with a continuous electrode 201. A high-voltage AC, such as 1 KHz, is supplied to the continuous electrode 201. Top plate are able to be formed by a material, such as indium tin oxide (ITO) that has the combined features of electrical conductivity and optical transparency in thin layer. Bottom plate can be implemented by semiconductor fabrication technologies. A dielectric insulator 206, e.g., $Si_3N_4/SiO_2$ of a passivation layer of standard CMOS fabrication, coated with a hydrophobic film 203 such as Teflon AF, is added to the plates to decrease the wettability of the surface and to add capacitance between the droplet and the control electrode. The droplet 205 containing biochemical samples and the filler medium, such as the silicone oil or air, are sandwiched between the plates to facilitate the transportation of the droplet 205 inside the filler medium. In order to move a droplet 205, a ground is applied to an electrode 209 adjacent to a deactivated electrode 210 by putting the electrode 212 into a high-impedance mode. The electrode 212 is directly under a droplet 205. The electrodes 208, such as electrodes 209 and 212, are electrically isolated and/or spaced by a separator 213.

In some embodiments, the electrode is controlled by a bi-state-switch 210. A logic low is applied to the electrode to activate the corresponding electrode and logic high is applied to deactivate the electrode.

In some other embodiments, the bi-state-switch technology is able to be expanded into a tri-state-switch technology that the third state is a logic '1' state. The logic '1' state has the voltage of power supply node VDD (3.5 V-0.4 V). The tri-state-switch technology is able to be used in other applications that the high-impedance '0' states are used for droplet actuation and the '1' state is used for detection or self-test. In some other embodiments, the logic '1' state is able to be used for droplet detection that the electrode on the bottom plate is charged up to VDD and then discharged. The discharging speed is able to be depends on the RC time constant of the capacitance of the electrode. An electrode with droplet on top of it has bigger capacitance than the one without droplet on top. By measuring the discharging (or charging) speed, the droplet is able to be detected.

Figure 3:
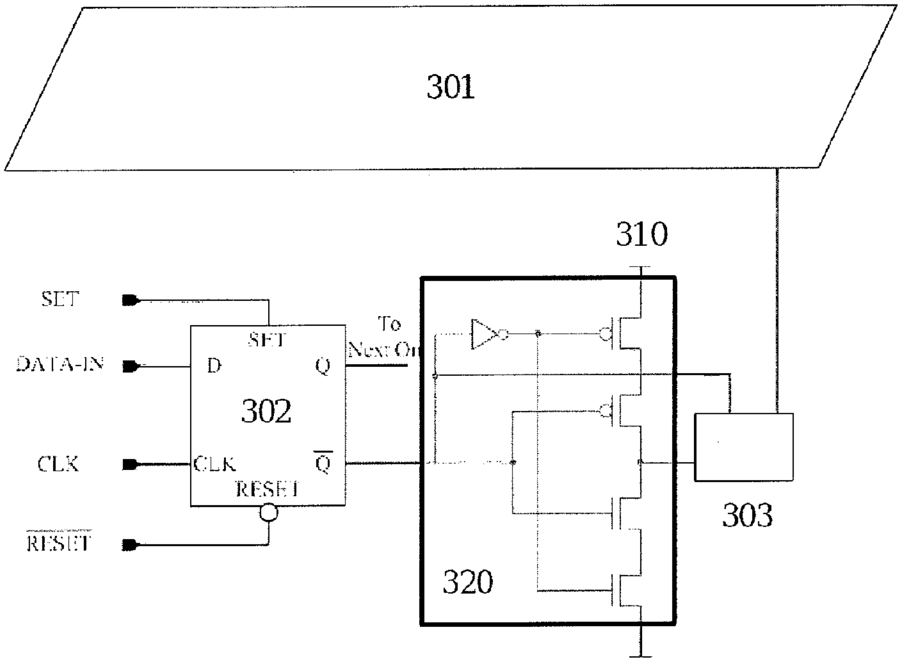
FIG. 3 is a diagram illustrating an electrical design of the electrode using standard CMOS fabrication technologies.

In some other embodiments as indicated by FIG. 3, standard CMOS components are used to implement the bi-state-switch. Electrode 301 is controlled by a bi-state-switch 320. VDD 310 (3.5 Volt-0.4 Volt) is the power-supply voltage used by a core circuitry. D flip-flop 302 is connected to the bi-state-switch 320 to indicate electrical control/detection circuitry, which is able to be integrated with the microfluidic components. Protection circuit 303 is built to protect and enhance the performance of the bi-state-switch.

In some other embodiments, protection circuitry 303 are built (1) to increase the breakdown voltage, (2) to reduce the leakage current of a positive voltage, (3) to prevent the short to ground of a negative voltage through p-n junction and (4) to increase the high-impedance of bi-state-switch electrodes in open mode.

Figure 4:
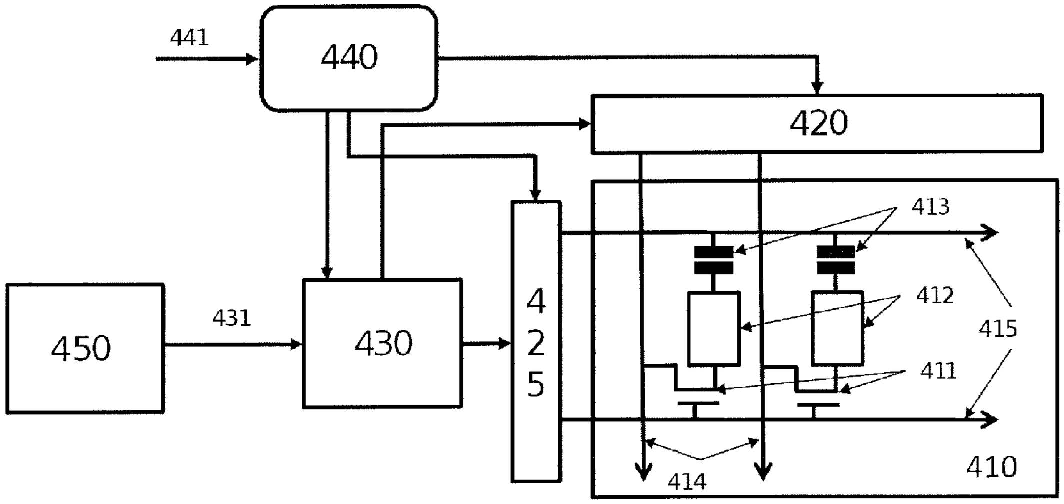
FIG. 4 is a diagram illustrating an electrical design of the electrode using standard TFT fabrication technologies.

In some embodiments as shown in FIG. 4. The bi-state-switches use transistors made of deposited thin films, which are therefore called thin-film transistors (TFTs) 411. The TFT-array substrate contains the TFTs 411, storage capacitors 413, microelectrodes 412, and interconnect wiring (bus-lines) 414 and 415. A set of bonding pads are fabricated on each end of the gate bus-lines 415 and data-signal bus-lines 414 to attach Source Driver IC 420 and Gate Driver IC 425. AM Controller 430 uses the data 431 from System Control 450 to drive the TFT-array by using a driving circuit unit comprising a set of LCD driving IC (LDI) chips, such as the Source Driver IC 420 and Gate Driver IC 425. DC power 441 applied to DC/DC Converter 440 which comprises discharge function, which shorts electrode 412 to GND (Ground) in order to actuate the droplet through a gate bus-line 415 to turn the TFT on. The storage capacitor is charged and the voltage level on the microelectrode 412 rises to the voltage level (GND) applied to the source bus-line 414. The main function of the storage capacitor 413 is to maintain the voltage on the microelectrode until the next signal voltage is applied.

In some embodiments, a TFT digital microfluidic system comprises five main blocks: Active-Matrix Panel 410, Source Driver 420, Gate Driver 425, DC/DC Converter 440 and AM Controller 430 as shown in FIG. 4. In Active-Matrix Panel 410, the gate bus-line 415 and source bus-line 414 are used on a shared basis, but each electrode 412 is individually addressable by selecting the appropriate two contact pads at the ends of the rows and columns.

Figure 5:
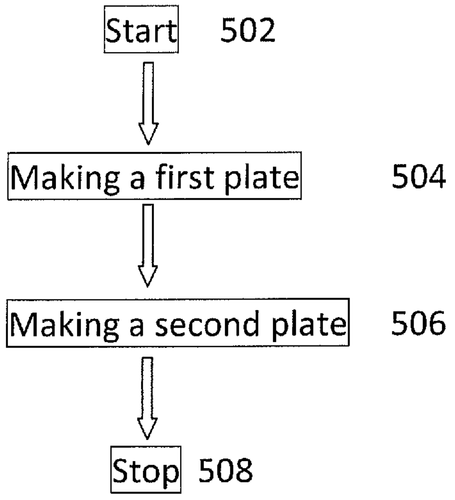
FIG. 5 is a flow chart illustrating a process of making a microfluidic system comprising bi-state-switch low-voltage driving electrodes.

FIG. 5 is a flow chart illustrating a process 500 of making a microfluidic system comprising bi-state-switch low-voltage driving electrodes. The process 500 is able to begin at Step 502. At Step 504, a first plate with continuous electrode is made. In some embodiments, the first plate couples with a power source capable of providing a voltage, such as 1 KHz AC. At Step 506, a second plate with multiple electrodes is made. The voltage of each of the multiple electrodes is able to be controlled independently. The top plate, the bottom plate, or both are able to contain dielectric layers covering the surface of the one or more of the electrodes. A device made by the process 500 is able to be used to drive a droplet to move. The droplet is able to contain biological substances to be detected/measured, such as glucose. In some embodiments, the droplet is polarizable, with a charge, or both. The process 500 is able to stop at Step 508.

Currently, there are some well-known limitations of typical CMOS (complementary metal-oxide semiconductor) fabrication technologies for implementing lab-on-a-chip (LOC), specifically the high-voltage handling capability for droplet actuation requirements. A lab-on-a-chip (LOC) is able to be a device that integrates one or several laboratory functions on a single chip of only millimeters to a few square centimeters in size. LOCs are able to be miniaturized laboratories that are able to perform many simultaneous biochemical reactions with the handling of extremely small fluid volumes down to less than pico liters. Lab-on-a-chip devices are able to be a subset of biochips. It is often indicated by "Microfluidics" as well. Microfluidics is a broader term that describes also mechanical flow control devices like pumps and valves or sensors like flowmeters and viscometers. The bi-state-switch technology enables the fabrication of LOC by low-voltage CMOS technologies. This makes large scale integration of microelectronics and microfluidics become possible. Central processing unit (CPU), memory and advanced detection circuitry can be integrated into a microfluidic LOC without concerns of power consumption, stability/cost of the high-voltage fabrication technologies and compatibility with existing CMOS designs. Especially, the emerging field of CMOS-based capacitive sensing LOC technology has recently received significant interest for a range of biochemical testing LOCs such as antibody-antigen recognition, DNA detection and cell monitoring. In some embodiments, devices are able to be used for continuous monitoring of glucose, drug-of-abuse, Prostate Cancer, Osteoporosis, Hepatitis and other diseases by antibody-antigen recognitions. In the mean time, fully integrated LOCs (including CPU, memory etc.) for biomarker detection, DNA detection and cell monitoring are able to be constructed by using this bi-state-switch technology.

Also, this enabling bi-state-switch technology makes the standard cell methodology work for the LOC design. Because this invention provides methods to implement LOCs fully by using standard CMOS components and library. So microfluidic standard cell is able to be created as other standard cells like NAND gate (Negated AND or NOT AND). In digital electronics, a NAND gate is a logic gate. NAND gates are able to be one of the two basic logic gates (the other being NOR logic) from which any other logic gates are able to be built. Standard cell methodology is an example of design abstraction, whereby a low-level very-large-scale integration (VLSI) layout is encapsulated into an abstract logic representation (such as a NAND gate). Standard cell-based methodology makes it possible for one designer to focus on the high-level (logical function) aspect of digital design, while another designer focuses on the implementation (physical) aspect. Along with semiconductor manufacturing advances, standard cell methodology has helped designers scale ASICs (Application-Specific Integrated Circuit) from comparatively simple single-function ICs (of several thousand gates), to complex multi-million gate system-on-a-chip (SoC) devices. Standard cell methodology is able to be implemented using the methods and devices of the present invention in the developments of LOCs.

The present invention has the advantage aspect that the polarity of the droplet actuation voltage is not a concern in actuating droplets. By moving the high-voltage to the top plate and implementing bi-state-switch technique on electrodes of the bottom plate, low-voltage fabrication technologies can be used to manufacture device for high-voltage driving applications. A person of ordinary skill in the art appreciate that the top plate and bottom plate are described as an example. The positions of the top plate and bottom plate able to be switched or in any orientation.

The bi-state-switch technique has two states: (1) when the electrode is activated, the electrode is shorted to voltage reference (ground) and (2) when the electrode is de-activated, the electrode is open (high-impedance).

The present invention is able to be utilized to drive a charged/polarizable droplet to move in a pre-determined direction by charge attraction/repulsion. In operation, different charge modes (e.g., activate, de-active) are able to be controlled in sequence to control the movement of the droplet.

The present invention has been described in terms of specific embodiments incorporating details to facilitate the understanding of principles of construction and operation of the invention. Such reference herein to specific embodiments and details thereof is not intended to limit the scope of the claims appended hereto. It will be readily apparent to one skilled in the art that other various modifications may be made in the embodiment chosen for illustration without departing from the spirit and scope of the invention as defined by the claims.

What is claimed is:

1. A device for high-voltage droplet actuation comprising:
   a. a first plate comprising a continuous electrode disposed on a first surface of a first substrate covered by a first hydrophobic layer, wherein the continuous electrode couples with a driving voltage source; and
   b. a second plate comprising an array of multiple electrodes disposed on a first surface of a second substrate covered by a first dielectric layer; wherein each of the multiple electrodes is spaced by a separator, wherein a second hydrophobic layer is disposed on the first dielectric layer forming a hydrophobic surface.

2. The device of claim 1, wherein the driving voltage source is configured to provide a driving voltage configured to actuate a droplet.

3. The device of claim 1, wherein the first plate further comprises a second dielectric layer.

4. The device of claim 3, wherein the first plate and second plate are insulated by the first and the second dielectric layer and the first and the second hydrophobic layers when a droplet is sandwiched between the first and the second plates, such that a damage to the second plate by a high-voltage driving voltage on the first plate is able to be avoided.

5. The device of claim 1, wherein the second plate is configured to short at least one of the multiple electrodes to GND in an actuating mode.

6. The device of claim 1, wherein the continuous electrode, the array of multiple electrodes, or both are configured to be deactivated in a high-impedance mode.

7. The device of claim 1, the array of multiple electrodes do not contain high-voltage components.

8. The device of claim 7, wherein the array of multiple electrodes are formed by CMOS, TFT, TTL, GaAs, or a combination thereof.

9. The device of claim 1, wherein the array of multiple electrodes comprises a first electrode adjacent to a second electrode.

10. The device of claim 9, further comprises a droplet disposed on the first electrode and overlapped with a portion of the second electrode.

11. The device of claim 1, further comprises a system management unit configured to generate one or more instructions manipulating one or more droplets among the multiple electrodes by sequentially grounding, activating or de-activating one or more selected electrodes such that a droplet is actuated to move along a selected route.

12. The device of claim 1, wherein the device comprises a EWOD device.

13. The device of claim 1, wherein the device comprises a DEP device configured to generate a driving voltage in the range from 50 kHz to 200 kHz of AC with 100 to 300 Vrms.

14. The device of claim 1, wherein the device comprises a CMOS device manufactured by a typical CMOS fabrication process.

15. The device of claim 14, further comprises a passivation layer.

16. The device of claim 15, wherein the passivation layer comprises an oxide material as a dielectric layer.

17. The device of claim 15, wherein the passivation layer comprises $Si_3N_4/SiO_2$ as a dielectric layer.

18. The device of claim 1, wherein the device comprises a CMOS device wherein a standard low-voltage (3.5 V-0.4 V) CMOS component is used to form a bi-state-switch.

19. The device of claim 1, wherein the device comprises a CMOS device comprising a protection circuitry configured to increase a breakdown voltage, reduce a leakage current of a positive voltage, prevent a short to ground of a negative voltage through p-n junction, increase a high-impedance of bi-state-switch electrodes in an open mode, or a combination thereof.

20. The device of claim 1, wherein the device comprises a TFT device comprises a bi-state-switch using transistors made of deposited thin films.

21. The device of claim 1, further comprises a DC power source applied to a DC/DC converter which comprises a discharge function that shorts one or more of the multiple electrodes to GND in order to actuate a droplet through a gate bus-line to turn a TFT on.

* * * * *